United States Patent [19]

Harris

[11] 4,452,361
[45] Jun. 5, 1984

[54] PNEUMATIC TOOL RACK

[76] Inventor: Marshall E. Harris, Rte. #1, Altoona, Wis. 54720

[21] Appl. No.: 272,713

[22] Filed: Jun. 11, 1981

[51] Int. Cl.³ .............................................. A47F 7/00
[52] U.S. Cl. .................................. 211/60 T; 403/361
[58] Field of Search .............................. 211/60 T, 90; 285/137 R, 161; 206/377, 373, 372; 312/33; 403/361

[56] References Cited

U.S. PATENT DOCUMENTS

| | | | |
|---|---|---|---|
| 295,746 | 3/1984 | Foster et al. | |
| 1,404,958 | 1/1922 | Hobbs | |
| 1,712,473 | 5/1929 | McWethy | |
| 2,371,433 | 3/1945 | Davis | 211/60 |
| 2,577,988 | 12/1951 | Wirth | 211/86 |
| 2,639,815 | 5/1953 | Paluck | 211/60 |
| 2,730,243 | 1/1956 | Platt | 211/87 |
| 2,805,777 | 9/1957 | Larson | 211/60 |
| 2,974,804 | 3/1961 | Maro | 211/60 T |
| 2,974,965 | 3/1961 | Welles, Jr. | 403/361 X |
| 3,004,767 | 10/1961 | Greene et al. | 403/361 X |
| 3,552,693 | 1/1971 | Scherf | 242/131 |
| 3,568,849 | 3/1971 | Hutchison | 211/60 |
| 3,580,394 | 5/1971 | Elliot | 211/60 |
| 3,603,551 | 9/1971 | Peterson | 248/314 |
| 3,604,565 | 9/1971 | Freeman | 211/60 |
| 3,726,393 | 4/1973 | Thompson | 211/60 T |
| 4,043,453 | 8/1977 | Greenlee | 206/349 |
| 4,171,559 | 10/1979 | Vyse et al. | 285/137 R X |
| 4,337,860 | 7/1982 | Carrigan | 312/DIG. 33 X |

Primary Examiner—William E. Lyddane
Assistant Examiner—Peter A. Aschenbrenner
Attorney, Agent, or Firm—Merchant, Gould, Smith, Edell, Welter & Schmidt

[57] ABSTRACT

A tool rack (1) for holding pneumatic tools (13) of the type having male air coupler nipples (18) is disclosed. The tool rack (1) has a plurality of mounting stud means, each having a receiving end for lockably cooperatively engaging the male air coupler nipples (18) of the pneumatic tools (13) to be held; whereby the tools will be supportably held by the mounting stud means when the male coupler nipples (18) are lockably engaged to the stud means. In a preferred embodiment, the mounting stud means includes a mounting stud (7) and a female air coupler (8). A means for fastening the mounting stud (7) to a platform member (5) is provided. In a preferred embodiment, the fastening means is a lock nut (6) for threadably fastening the mounting stud (7) to the platform member (5). Fastened to the platform member (5) are a plurality of braces (2) to allow for fastening the tool rack (1) to a supporting surface (4).

12 Claims, 7 Drawing Figures

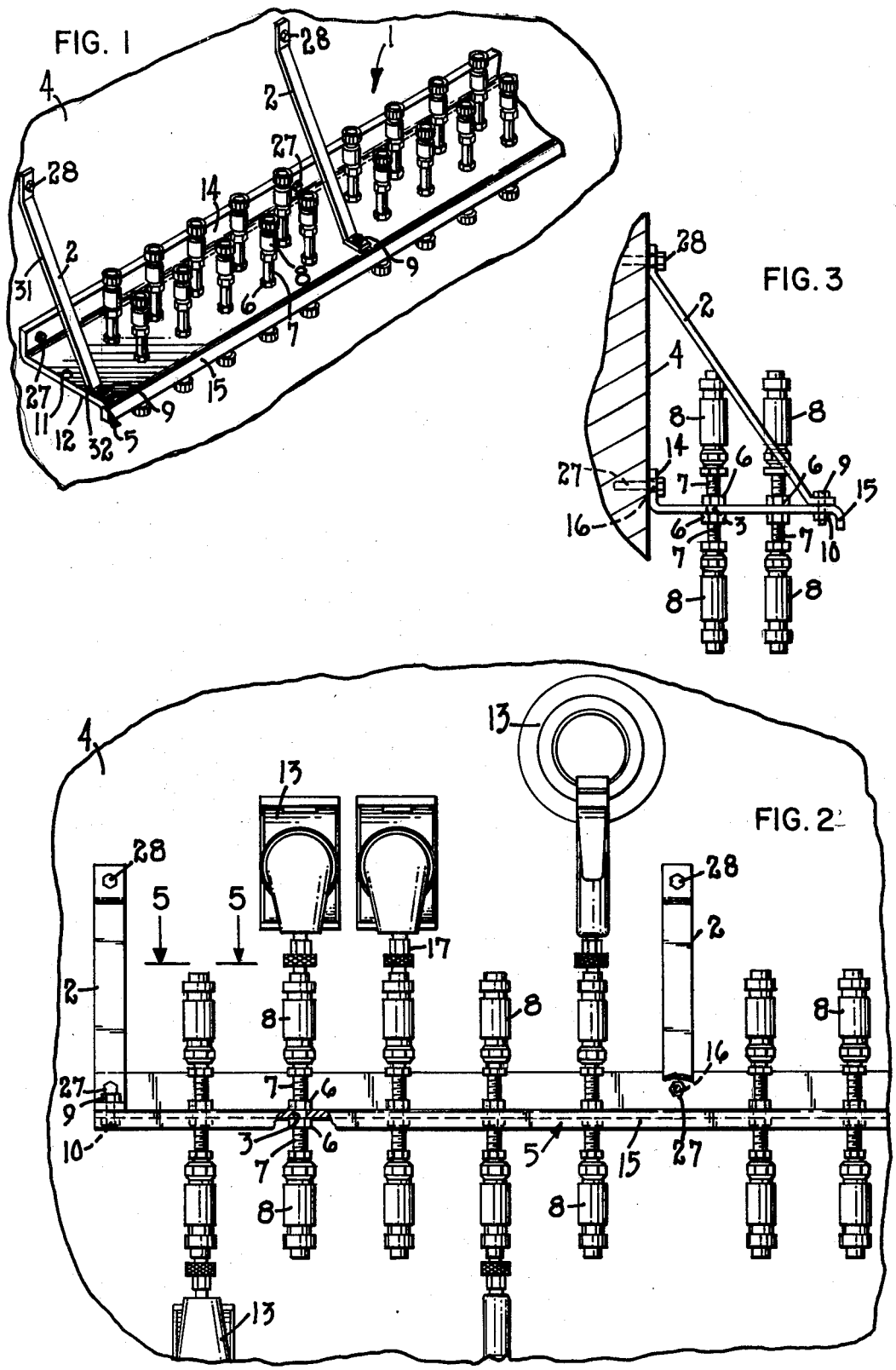

PNEUMATIC TOOL RACK

BACKGROUND OF THE INVENTION

1. Field of the Invention

This invention relates generally to tool racks and more particularly to tool racks for use with pneumatic tools.

2. Description of the Prior Art

Pneumatic tools can be used wherever there is a source of compressed air. Because of this requirement for compressed air, pneumatic tools are usually not found in the home. However, because of advantages in using such tools, they are often found in many small garages and body shops. In addition, they are found in many manufacturing facilities. The users of pneumatic tools typically have a large number of different pneumatic tools on hand, which requires that there be a storage location for the tools when they are not in use.

In the past, such tools were found scattered about a work bench. If they are stored, they are often placed on a shelf or in a drawer. Placing each individual tool on a shelf takes up a large amount of space. It also leaves the area looking disorganized. While placing the individual tools in a drawer will make a work area look neater, this practise requires a large amount of storage space. In addition, the tools are not in plain sight, and therefore are not readily available. There has been a long felt need in the industry to provide a tool rack that securely and orderly supports pneumatic tools. The pneumatic tools should be displayed in a manner to allow for quick inventory of all the tools in the rack. It would also be advantageous for such a tool rack to allow for quick and easy withdrawal of the pneumatic tools when their use is required. Such a tool rack should help prevent damage to the tools by rigidly holding the tools as they are stored. Preferably, the tool rack should provide for storage on both the top and bottom of the rack to provide more compact storage.

To date, there are no known special tool racks available for the storage of pneumatic tools. While there are no tool racks available which provide the features described in the preceeding paragraph for pneumatic tools, there are prior art devices which have incorporated one or several of the features for non-pneumatic tools. One such device is a tool rack for yieldably gripping long slender shanks of tools. A resilient material, such as natural or synthetic rubber, is mounted under a top wall. The top wall has a number of openings for receiving the shanks of tools. The resilient material has cross slits at spaced intervals which align with the openings in the top wall. The slender shank of a tool is inserted through the cross slits of the resilient material which causes the resilient material to spread apart and compress, providing support for holding the shank of a tool. This type of device works only for tools with long slender shanks and not for large tools which may be top heavy. The rsilient material does not provide enough force to hold the male air coupler nipple of a pneumatic tool in a substantially upright position. The weight of the pneumatic tool would cause the male air coupler nipple to pass completely through the resilient material, causing the lower portion of the body of the pneumatic tool to rest upon the outer surface of the tool rack. Further, if such a structure were used for holding pneumatic tools, the tools would be free to tilt on their vertical axes, possibly hitting adjacent pneumatic tools and thereby becoming damaged. Such a device could not be used to store pneumatic tools on both the top and bottom portions of the rack because the resilient material does not provide enough support for holding a pneumatic tool in an inverted position.

Another known device which also uses a resilient material is designed to hold a cutting tool in a tool magazine. The gripping means comprises a ring of resilient material housed in an annular recess in a cylindrical wall of the tool holder. The cylindrical wall of the tool holder has a diameter greater than the diameter of the tool that is held. The diameter of the circle defined by the resilient material is slightly smaller than that of the tool. Therefore, when a tool is inserted into the cylindrical hole, there is a friction fit between the tool and resilient material. In addition to being held in place by the resilient material, additional support for the tool is received when the bottom edge of the tool rests on the floor of the cylindrical hole.

This type of tool rack could not be used to store pneumatic tools on both the top and bottom portions of the rack because the resilient material alone does not provide enough support to hold a pneumatic tool in an inverted position. While this tool rack provides more support than the tool rack discussed in the preceeding paragraph, the varying diameter of the male air coupler nipple portion of a pneumatic tool creates difficulties in obtaining a secure grip of the tool by its outer surface, and the pneumatic tool can tilt on its vertical axis, possibly hitting and damaging adjacent pneumatic tools.

There is yet another type of device that is used to store tools. A tool is held in a carrier having a circumferential groove. The tool and the carrier are retained in an annular member of the tool rack by means of pin elements in the annular member which are spring loaded inward into the groove. As the tool and the carrier are inserted into the annular member, the spring elements are urged against the action of the springs until the circumferential groove registers with the pin elements, whereupon the pin elements are urged by the spring, and engaged in the circumferential groove to retain the two in the annular member. As in the device previously described, the tool in the carrier is also supported by a bottom wall of an annular member.

The tool in the carrier is removed by lifting the tool upwards. The spring elements are forced backward by the surface of the circumferential groove. This does not provide for positive engagement of the tool with its carrier. As with the previously described prior art tool holding devices, pneumatic tools can not be stored on the top and bottom portions of the rack. With such a structure, a pneumatic tool will not be supported in inverted position, but will fall from the bottom of the tool rack.

The last two tool racks that were described are typically used for carrying cutting tools for use with numerically controlled equipment. Their design and construction result in tool racks that are custom ordered for the particular types of cutting tools used, and are relatively expensive.

The present invention addresses the above problems that are associated with the storage of tools, and in particular with the storage of pneumatic tools.

SUMMARY OF THE INVENTION

The present invention is a tool rack being particularly constructed for the storage of pneumatic tools. The tool rack includes a platform member, a plurality of mounting studs, means for fastening the mounting studs to the platform member and a plurality of female air couplers attached to the mounting studs. The tool rack is preferably constructed to be fastened to a vertical wall or support surface, but could also be constructed to be free standing.

In one embodiment of the invention, the platform member has an upwardly extending back flange and a downwardly extending front flange, giving the platform increased longitudinal rigidity. The back flange has a plurality of holes through which anchors are inserted to fasten the platform member to a supporting surface. A plurality of braces are used to give additional support to the platform. One end of the brace is adapted to be fastened to the supporting surface above the platform member and the other end of the brace is connected to the top surface of the platform member.

A plurality of mounting studs are fastened to the platform member and are spaced therealong in a manner so as to supportingly hold in upright spaced manner, a plurality of pneumatic tools, as hereinafter described. In one embodiment the platform member has a plurality of holes which extend through the top and bottom surface of the platform member. Mounting studs are inserted through the holes of the platform member. The mounting studs extend both above and below the platform member. In a preferred construction, the mounting studs are cylindrical tubes having a threaded exterior, and are fastened to the platform member by a lock nut on both the top and bottom surfaces of the platform member. In one embodiment, a threaded pipe is used for the cylindrical tube. A female air coupler is screwed onto each end of the threaded pipe.

In general, a pneumatic tool (not forming a part of the invention), has an opening for the rigid connection of a male air coupler nipple. The male air coupler nipple is cooperatively inserted into a female air coupler which is generally attached to a hose from a compressed air supply.

The female air coupler that is used on the air hose is of the same type as the female air couplers used on the tool rack. In practice the female air couplers used on the tool rack can be old couplers that are leaky or otherwise not suitable for operative use on an air hose, but which are still adequate for engagably supporting a pneumatic tool as herein described. Therefore, when a person is finished using a pneumatic tool, the tool is released from the female air coupler on the air hose, and inserted into a female air coupler on the tool rack. A rigid connection is affected between the male and female air couplers by simply inserting in snap-fit manner the male air coupler nipple into the female air coupler until the female coupler locks onto the male coupler, as is well known in the art.

The present invention thus provides a means for securing and orderly supporting pneumatic tools in a tool rack. The pneumatic air tools can be easily inserted into the tool rack and also easily and quickly withdrawn from the rack. The damage that can often occur to tools that are left scattered about a workbench is thus minimized by this tool rack. Also, because the tools are in plain sight, a quick inventory of the pneumatic tools can easily be taken. These and other advantages of my invention will become apparent with reference to the accompanying drawing, description and claims.

BRIEF DESCRIPTION OF DRAWING

FIG. 1 is a view in perspective of the tool rack incorporating my present invention.

FIG. 2 is a front elevation of the tool rack of FIG. 1.

FIG. 3 is a side elevation of the tool rack shown in FIG. 1.

DESCRIPTION OF THE PREFERRED EMBODIMENT

Figure 5:
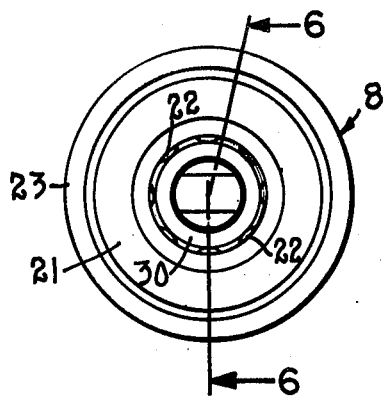
FIG. 5 is an end view of the front section of a female air coupler illustrated in FIG. 2, as generally viewed from the line 5—5 of FIG. 2.

Referring to the drawing, wherein like numerals represent like parts throughout the several views, a tool rack designated generally as 1 is shown in FIG. 1. The tool rack includes a platform member 5 having a top surface 11 and a bottom surface 12. The platform member 5 is constructed from a rigid material. In the preferred embodiment, the material is steel. However, it will be understood that other suitable materials could also be used. The platform member 5 has an upward extending back flange 14 and a downward extending front flange 15. The flanges add structural stability and rigidity to the platform 5.

The platform member 5 has a plurality of mounting studs 7 mounted thereto. The mounting stud 7 is constructed from a rigid material. Referring to one such mounting stud, in the preferred embodiment, (see FIG. 3), platform member 5 has a hole 3 through which the mounting stud 7, which is a threaded pipe, is inserted. The threaded stud 7 extends above the top surface 11 and below the bottom surface 12. The stud is secured to the platform by fastening means 6. In the preferred embodiment, the fastening means comprise a pair of locknuts 6, tightened so as to respectively engage both the top surface 11 and bottom surface 12 of the platform. It is understood that there are a variety of methods that can be used to fasten the mounting stud 7 to the platform member 5. For example, it would be possible to weld a mounting stud 7 to a platform member 5, in which case there would be no need for the hole 3. If pneumatic tools are stored only on one side, it is of course not necessary to have the mounting studs 7 extend above both the top surface 11 and the bottom surface 12. Similarly, while the mounting studs are illustrated as being directly opposed from one another on the top and bottom sides of the platform, such arrangement could be varied, such as by staggering the alignment of the top and bottom studs.

FIG. 3 shows the preferred embodiment of the tool rack 1 fastened to a vertical supporting surface 4. The back flange 14 has a plurality of holes 16 extending therethrough. A plurality of anchor bolts 27 are inserted through the holes 16 and are used to fasten the back flange 14 to the supporting surface 4. One or more fastening means 2, for example braces, is used to help support the platform member 5 on the supporting surface 4. An anchor bolt 28 is used to fasten the top end 31 of the brace 2 to the supporting surface 4. A bolt 9 and nut 10 are used to fasten the bottom end 32 of brace 2 to the platform member 5. While a particular manner of fastening the tool rack to a supporting surface has been disclosed, it will be understood that the tool rack 1 may be fastened to the supporting surface 4 by any other suitable means.

While it is preferable that the tool rack 1 be fastened to a supporting surface 4, it is understood that the tool rack 1 could be free standing. For example, legs could be attached to the platform member 5 to provide support for the tool rack 1. If the mounting studs 7 are only fastened to one surface of the platform member 5, the tool rack 1 could simply be set on the top of a surface.

Figure 4:
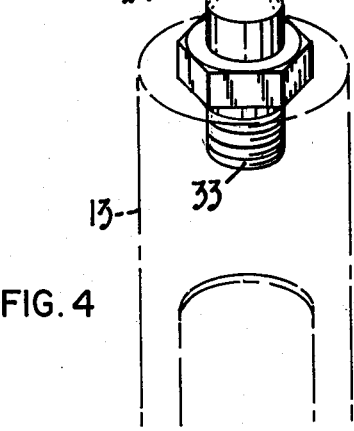
FIG. 4 is a view in perspective of a male air coupler nipple of a pneumatic tool illustrated in FIG. 2.

Typical construction of a male air couler nipple is illustrated in FIG. 4. Referring to FIG. 4, the male air coupler nipple is designated generally at 17, and includes a first tube 18, a ring 19, a second tube 20 with a smaller diameter than that of the ring 19 and a threaded base 33. The male coupler is configured to be securely threaded into the operative end of a pneumatic tool, as illustrated, for example, in FIG. 2, and in phantom in FIG. 4.

Figure 6:
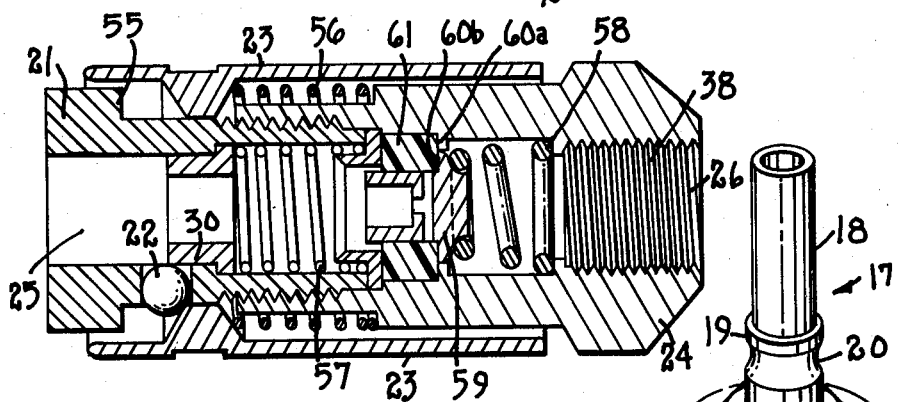
FIG. 6 is a cross-sectional view of the female air coupler of FIG. 5, taken along the line 6—6 of FIG. 5.

FIG. 5 and FIG. 6 show a female air coupler, designated generally as 8. Various designs of female air couplers are well known in the art, and that female air coupler 8 that is illustrated is an example of one such design. In the preferred embodiment, the female air coupler has a housing 21 and a check housing 24 threaded to the housing 21. A coupler sleeve 23 is coaxially slidably mounted to the housing 21 and check housing 24 for axial movement relative thereto. The housing 21 defines a cylindrical cavity 25 having a circular cross-section. A plurality of coupling pins 22 are movably located within an annular recess of the housing 21. A first spring 56 is connected to the coupler sleeve 23 and provides a bias force tending to move the coupler sleeve away from the check housing 24. A stop surface 55 prevents the coupler sleeve 23 from axially moving off the housing 21.

The coupler sleeve 23 provides a bias force tending to move the coupling pins 22 toward the center of the female air coupler 8. The pin retainer 30 prevents the coupler pins 22 from moving into the cylindrical cavity 25. A second spring 57 is connected to the pin retainer 30 and provides a bias force tending to move the pin retainer 30 away from the check housing 24.

The check housing 24 defines a cylindrical cavity 38 having a circular cross-section and having an interior threaded wall 26. A spring 58 is connected to a pin receiving member 59 providing a bias force tending to move edge 60a against edge 60b of sealing member 61.

Figure 7:
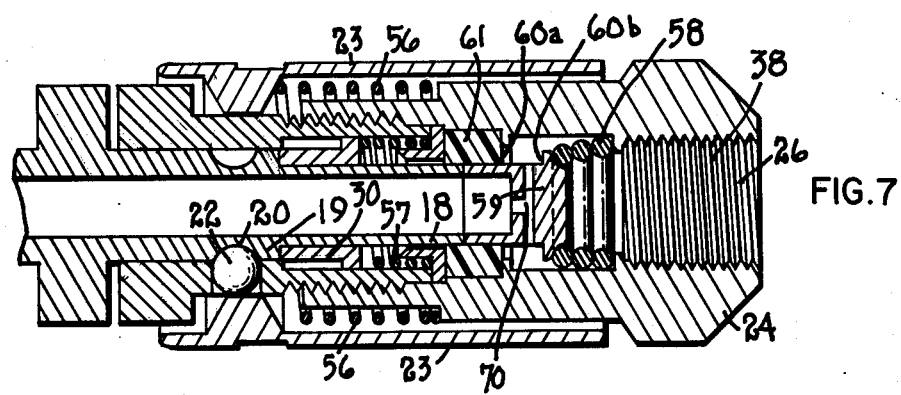
FIG. 7 is a cross-sectional view of the female air coupler of FIG. 5 shown with the male air coupler nipple of FIG. 4 inserted therein.

As shown in FIG. 7, means for retaining the male air coupler nipple 17 after insertion into the cylindrical cavity 25 is provided when the ring 19 moves the pin retainer 30 against the bias of spring 57. This allows the coupling pins 22 to forceably contact the tube 20 of the male air coupler 17. The coupling pins 22 prevent the male air coupler nipple 17 from being removed from the female air coupler 8 and provides a rigid connection between the male air coupler nipple 17 and the female air coupler 8. The end of the first tube 18 engages the pin receiving member 59 and forces the pin receiving member 59 to move against the bias of spring 58. When the female air coupler 8 is attached to an air hose (not shown), pressurized air passes through the cylindrical cavity 38, through passage 70 in the pin receiving member 59 and through the male air coupler nipple 17 to the pneumatic tool 13.

When the coupler sleeve 23 is moved toward the check housing 24, the coupling pins 22 are allowed to move outward from the tube 20, thereby releasing the male air coupler nipple 17. This provides a quick release means for the male air coupler nipple 17 to be released from the female air coupler 8.

One female air coupler 8 is fastened to each of the mounting studs 7. In the preferred embodiment, the check housing 24 is screwed onto the threaded pipe mounting stud 7.

The female air couplers 8 need not be new as they do not have to be air tight. If the female air coupler 8 is purchased new, it may be switched from the tool rack 1 to the regular air pressure lines and hose as needed. The used female air coupler 8 from the shop line can then be installed on the tool rack 1.

As previously described, a pneumatic tool 13 has rigidly attached to it a male air coupler nipple 17 (see FIGS. 2 and 4). To use the pneumatic tool 13, the male air coupler nipple 17 is inserted into a female air coupler 8 that is attached to an air hose (not shown) and the tool is used to perform its specified function. When the worker is done using the pneumatic tool 13, it is disconnected from the air hose coupler and the male air coupler nipple 17 remains attached to the tool. The male air coupler nipple 17 is then inserted into the female air coupler 8, that is identical or similar to the female air coupler on the air hose. This provides a rigid connection between the tool rack 1 and the pneumatic tool 13. Because such connection is both rigid and secure, the pneumatic tool 13 can be inserted into the female air coupler 8 on either the top surface 11 or the bottom surface 12 of the platform 5, thereby increasing the storage capability of a limited space. FIG. 2 shows several pneumatic tools 13 stored on the tool rack 1. The tools are held in upright spaced relationship to one another in a manner so as not to touch or rub against one another and so as to allow use of engagement to and disengagement from the platform.

The standard pneumatic tool uses a ¼ inch air line. Therefore, in the preferred embodiment, the hole 3 is approximately 9/16 inch, the threaded pipe 7 is ¼ inch in diameter by approximately 2 inches in length. The lock nut 6 and the female air coupler 8 are threaded to the ¼ inch stud. Larger air tools use a ⅜ inch line. The tool rack 1 is easily adapted to this size by sizing the hole 3, to approximately 11/16 inch, the threaded pipe 7 to ⅜ inch in diameter by approximately 2 inches in length, with appropriately accommodatingly sized lock nuts and air coupler. It will be understood, however, that the invention applies equally well to any pneumatic connectors of any size and configuration.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having these specific configurations and shapes as presented herein. All alternative modifications and variations of the present invention which fall within the spirit and broad scope of the appended claims are included.

What is claimed is:

1. A tool rack for holding pneumatic tools of the type having male air coupler nipples, comprising:
 (a) a platform member having top and bottom surfaces;

(b) means for supporting said platform member wherein said surfaces are substantially horizontal;

(c) a plurality of mounting stud means, each having a receiving end; and (d) a plurality of female air coupler members, each of said female air coupler members cooperatively connected to the receiving end of one of said mounting stud means, said female air coupler members adapted to quick-releasably lockably engage the male air coupler nipples of the pneumatic tools to be held, wherein the tools are supportably latched to said female air coupler members when the male air coupler nipples are lockably engaged to said female air coupler members; and (e) means for fastening said mounting stud means in spaced apart relationship to said platform member, wherein said receiving ends extend below said bottom surface, whereby the tools are quick-releasably lockably supported in inverted positions by said tool rack when the male air coupler nipples and female air coupler members are lockably engaged.

2. The tool rack of claim 1, wherein said receiving ends extend above and below said platform member, whereby the tools are quick-releasably lockably supported in upright and inverted positions by said tool rack when the male air coupler nipples and female air coupler members are lockably engaged.

3. The tool rack of claim 2, wherein said platform member has a plurality of holes for receiving said mounting stud means.

4. The tool rack of claim 3, wherein at least one of said mounting stud means comprises a cylindrical tube having a threaded exterior portion and wherein said fastening means includes a lock nut for threadably fastening said tube to said platform member.

5. The tool rack of claim 4, wherein said female air coupler member comprises:
  (a) a front section having a housing; said housing defining a cylindrical cavity having a circular cross-section to receive a male air coupler nipple;
  (b) means for retaining the male air coupler nipple after insertion into said cylindrical cavity;
  (c) means for quick release of said male air coupler nipple from said cavity; and
  (d) a back section defining a cylindrical cavity having a circular cross-section and having an interior threaded wall fastened to said mounting studs.

6. The tool rack of claim 2, wherein said fastening means includes means for threadably securing said mounting stud means to said platform member.

7. A tool rack for holding pneumatic tools of the type having male air coupler nipples, comprising:
  (a) a platform member having a top surface and a bottom surface and a plurality of spaced apart holes extending therethrough;
  (b) a plurality of cylindrical tubes having threaded ends, said tubes being inserted through said holes such that said tube ends extend above said top surface and below said bottom surface;
  (c) means for fastening said tubes to said platform member; and
  (d) said threaded ends being adapted to receive female air coupler members of the type suitable for lockably quick-releasably engaging the male air coupler nipples of the pneumatic tools to be held, wherein the tools are supportably latched to said female air coupler members when the male coupler nipples are lockably engaged with the female air coupler members.

8. The tool rack of claim 7, further including means for securing said platform member to a generally planar support surface.

9. The tool rack of claim 8, wherein said securing means comprises:
  (a) a plurality of brace members, each having a first end fastened to said platform member and a second end suitable for fastening to the planar support surface; and
  (b) said platform member having an upwardly extending back flange defining a plurality of holes therethrough, for accepting fastening members for securing the back flange to the planar support surface.

10. The tool rack of claim 7, wherein said tubes are externally threaded substantially along their entire length, and wherein said fastening means comprises a pair of nut members threaded to each tube and disposed to securely engage said top and bottom surfaces of said platform.

11. A tool rack for holding pneumatic tools of the type having male air coupler nipples, comprising:
  (a) a platform member having a top surface and a bottom surface and a plurality of spaced apart holes extending therethrough;
  (b) a plurality of cylindrical tubes having threaded ends, said tubes being inserted through said holes such that said tube ends extend above said top surface and below said bottom surface;
  (c) means for fastening said tubes to said platform member;
  (d) said threaded ends being adapted to receive female air coupler members of the type suitable for lockably quick-releasably engaging the male air coupler nipples of the pneumatic tools to be held, wherein the tools are supportably latched to said female air coupler members when the male coupler nipples are lockably engaged with the female air coupler members; and
  (e) each of said female air coupler members comprises:
    (i) a front section having a housing; said housing defining a cylindrical cavity having a circular cross-section to receive a male air coupler nipple;
    (ii) means for latchably retaining the male air coupler nipple after insertion into said cylindrical cavity;
    (iii) means for quick release of said male air coupler nipple from said cavity; and
    (iv) a back section defining a cylindrical cavity having a circular cross-section and having an interior threaded wall suitable for fastening to one of said threaded ends.

12. The tool rack of claim 11, further comprising:
  (a) a plurality of brace members, each having a first end fastened to said platform member and a second end suitable for fastening to the planar support surface; and
  (b) said platform member having an upwardly extending back flange defining a plurality of holes therethrough, for accepting fastening members for securing the back flange to the planar support surface.

* * * * *